(12) United States Patent
Kurosawa

(10) Patent No.: US 7,663,694 B2
(45) Date of Patent: Feb. 16, 2010

(54) DIGITAL CAMERA

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 609 days.

(21) Appl. No.: 10/900,322

(22) Filed: Jul. 28, 2004

(65) Prior Publication Data
US 2005/0024529 A1  Feb. 3, 2005

(30) Foreign Application Priority Data
Jul. 29, 2003 (JP) ............................ 2003-281567

(51) Int. Cl.
H04N 5/225 (2006.01)
(52) U.S. Cl. .................... 348/374; 348/373; 257/433
(58) Field of Classification Search ................ 348/374, 348/375, 373, 340, 335, 376
See application file for complete search history.

(56) References Cited

U.S. PATENT DOCUMENTS

| | | | |
|---|---|---|---|
| 4,279,494 A | 7/1981 | Yoshikawa et al. | |
| 4,417,796 A | 11/1983 | Sugiura et al. | |
| 4,594,613 A * | 6/1986 | Shinbori et al. | 348/340 |
| 5,034,824 A | 7/1991 | Morisawa et al. | |
| 5,153,734 A * | 10/1992 | Kanamori et al. | 348/340 |
| 5,510,973 A | 4/1996 | Morioka | |
| 5,570,231 A | 10/1996 | Mogamiya | |
| 5,627,589 A * | 5/1997 | Ejima et al. | 348/340 |
| 6,035,147 A | 3/2000 | Kurosawa | |
| 6,342,922 B1 * | 1/2002 | Mizoguchi | 348/355 |
| 6,654,064 B2 * | 11/2003 | Ishikawa | 348/374 |
| 6,665,016 B2 | 12/2003 | Saitoh | |
| 6,956,615 B2 * | 10/2005 | Nakagishi et al. | 348/374 |
| 7,215,372 B2 * | 5/2007 | Ito et al. | 348/340 |
| 2001/0010562 A1 | 8/2001 | Nakagishi et al. | |
| 2003/0197786 A1 | 10/2003 | Hirunuma | |
| 2005/0219397 A1 * | 10/2005 | Huang | 348/335 |

FOREIGN PATENT DOCUMENTS

| | | |
|---|---|---|
| JP | 061-138909 | 6/1986 |
| JP | 2000-333050 A | 11/2000 |
| JP | 2001-285696 | 10/2001 |
| JP | 2001-309214 | 11/2001 |

(Continued)

OTHER PUBLICATIONS

Rake S. T., Finding Parallel Structures, Jul. 1989, IBM UK Scientific Centre, UK, Image Processing and its Applications, 1989, Third International Conference, pp. 628-632.*

(Continued)

Primary Examiner—Jason Chan
Assistant Examiner—Cynthia Calderon
(74) Attorney, Agent, or Firm—Greenblum & Bernstein P.L.C.

(57) ABSTRACT

A digital camera includes an image sensor unit which is fixed to a camera body, the image sensor incorporating an image sensor package including an image sensor, and a reference plate which serves as a positional reference when fixed to the camera body, the image sensor package being mounted to the reference plate; and an adjusting device, incorporated in the image sensor unit, for adjusting at least an inclination of the image sensor with respect to a reference surface of the reference plate.

15 Claims, 5 Drawing Sheets

FOREIGN PATENT DOCUMENTS

| | | |
|---|---|---|
| JP | 2003/69886 | 3/2003 |
| JP | 2003-143448 | 5/2003 |

OTHER PUBLICATIONS

U.S. Appl. No. 10/900,153, to Kurosawa.
U.S. Appl. No. 10/900,142, to Kurosawa.
U.S. Appl. No. 10/900,136, to Kurosawa.
English language Abstract of JP 061-138909.
English language Abstract of JP 2001-285696.
English language Abstract of JP2001-309214.
English language Abstract of JP 2003-143448.
English language Abstract of JP 2000-333050 A.

* cited by examiner

DIGITAL CAMERA

BACKGROUND OF THE INVENTION

1. Field of the Invention

The present invention relates to a digital camera having an image pick-up device such as a CCD image sensor, and more specifically relates to such a digital camera which includes an improved structure for fixing the image pick-up device that is to be included in a camera body of the digital camera.

2. Description of the Related Art

A CCD image sensor is widely used as an image pick-up device (image sensor) of a digital camera. This type of CCD image sensor is usually provided in the form of a CCD package (image sensor package), and this CCD package is included in a camera body, mounted thereto. The CCD package is constructed so that a CCD chip (CCD image sensor) is fixed to a package base by adhesive or solder and so that the CCD chip is electrically connected to external leads provided on the package base. A protection glass plate is fixed to the front of the package base to seal the CCD chip between the protection glass plate and the package base. The CCD package which is structured in such a manner is installed at a position (image forming position) inside the camera body in the vicinity of the rear surface thereof where an image is formed through a photographing optical system. It is generally the case that the CCD package, together with a low-pass filter and other components which are to be positioned in front of the CCD image sensor, is mounted to a reference plate to constitute a CCD unit (image sensor unit) and that this CCD unit is fixed to the camera body via the reference plate. Additionally, a light receiving surface (imaging surface) of the CCD chip is oriented to be orthogonal to the optical axis of the photographing optical system at a position of an image plane, on which an image is formed through a photographing optical system, usually at a focal point of the photographing optical system.

Such a conventional type of CCD unit is made by bonding a rear surface of the package base of the CCD package to a front surface (fixing surface) of the reference plate by adhesive when the CCD package is mounted to the reference plate. Fixing the reference plate of this CCD unit to a camera body at a given position thereon makes it possible for the reference plate to be installed with the reference plate being orthogonal to the optical axis of the photographing optical system, and makes it possible for the imaging surface of the CCD chip to be positioned orthogonal to the optical axis of the photographing optical system at a focal point thereon, and further makes it possible to determine the focal point.

However, it is often the case that adhesive or solder by which the CCD chip is fixed to the package base is not evenly coated on the package base. Accordingly, a CCD package in which the CCD chip is bonded to the package base with the imaging surface of the CCD chip not being precisely parallel to the package base is often produced. Therefore, even if the CCD package is bonded to the reference plate of the CCD unit, the CCD unit in which the imaging surface of the CCD chip is precisely parallel to the reference plate cannot be obtained. Consequently, the imaging surface of the CCD chip cannot be oriented in a position precisely orthogonal to the optical axis of the photographing optical system, so that the imaging surface of the CCD chip is slightly inclined to the focal plane. Moreover, the focal point does not coincide with the imaging surface of the CCD chip.

In a digital camera using a small-format CCD image sensor as a CCD chip incorporated in the CCD package, in which the diagonal size of the imaging surface of the CCD chip is equal to or smaller than ½ inch, the aperture of an imaging lens is small so as to correspond to the diagonal size of the imaging surface of the CCD chip while the imaging angle on the imaging surface with respect to the optical axis of the imaging lens is small. In contrast to such a digital camera, in a digital camera using a large-format CCD image sensor as a CCD chip incorporated in the CCD package, in which the diagonal size of the imaging surface of the CCD chip is equal to or greater than ⅔ inches, the aperture of an imaging lens is large and the imaging angle on the imaging surface with respect to the optical axis of the imaging lens is large. Accordingly, the depth of focus in the case of using the large-format CCD image sensor is narrower than the depth of focus in the case of using the small-format CCD image sensor. Therefore, if the CCD package is fixed to a camera body with the imaging surface of the CCD chip being slightly inclined to a plane orthogonal to the optical axis of a photographing optical system, an image that is formed on a periphery of the imaging surface, a deviation of which from a focal plane in the optical axis direction is greater than a deviation of a central portion of the imaging surface from the focal plane in the optical axis direction, easily becomes out-of-focus (blurred); the amount of defocus becomes conspicuous specifically in the case of using the large-format CCD image sensor, in which the deviation in the optical axis direction in the periphery of the imaging surface becomes great. Accordingly, in the case of using the large-format CCD image sensor, a positional deviation of the imaging surface cannot be tolerated in the depth of field of a photographing lens.

As can be understood from the above description, a conventional CCD unit is not always constructed so that the imaging surface of the CCD chip is precisely parallel to the reference plate. Therefore, a structure for positioning the imaging surface of the CCD chip so that the imaging surface becomes orthogonal to the photographing optical axis is required when the CCD unit is fixed to a camera body. For instance, a structure fixing the CCD unit to a camera body has been proposed in Japanese Unexamined Patent Publication 2003-69886. According to this fixing structure, a camera body is provided with a plurality of screw holes, a corresponding plurality of adjusting cylindrical members are respectively screwed into the plurality of screw holes, and a reference plate of the CCD unit is fixed to the plurality of adjusting cylindrical members by set screws with the reference plate contacting with end surfaces of the plurality of adjusting cylindrical members. This fixing structure makes it possible to adjust the inclination of the reference plate so that the imaging surface of the CCD chip becomes precisely orthogonal to the photographing optical axis by varying the height (axial position) of the end surface of each adjusting cylindrical member by changing the rotational position of each adjusting cylindrical member while viewing the image captured by the imaging surface of the CCD chip.

Providing a camera body with such a conventional fixing structure increases the number of elements of a camera, and also requires that an adjusting operation be performed in which the aforementioned plurality of adjusting cylindrical members are adjusted while it is visually checked whether the imaging surface of the CCD chip is directed toward a predetermined direction when the CCD unit is installed in the camera body. Accordingly, the aforementioned conventional fixing structure complicates the operation installing the CCD unit in a camera body, which is in need of improvement.

SUMMARY OF THE INVENTION

The present invention provides a digital camera using an image pick-up device, wherein the digital camera has a structure making it possible for the image pick-up device to be installed in a camera body in a state where the imaging surface of the image pick-up device is precisely positioned with respect to a focal plane that is orthogonal to the optical axis of a photographing lens.

According to the present invention, a digital camera is provided, including an image sensor unit which is fixed to a camera body, the image sensor incorporating an image sensor package including an image sensor, and a reference plate which serves as a positional reference when fixed to the camera body, the image sensor package being mounted to the reference plate; and an adjusting device, incorporated in the image sensor unit, for adjusting at least an inclination of the image sensor with respect to a reference surface of the reference plate.

It is desirable for the image sensor package to be bonded to the reference plate after the inclination of the image sensor is adjusted by an operation of the adjusting device.

It is desirable for the adjusting device to include a holding member made of a resilient material which holds the image sensor package to the reference plate while allowing the image sensor package to be tilted relative to the reference plate; and a plurality of adjusting screws, each of which can be brought into point contact with the image sensor package so that the image sensor package is supported by a fixing surface of the reference plate via the adjusting screws, wherein a distance between the image sensor package and the fixing surface of the reference plate can be adjusted by turning at least one of the plurality of adjusting screws.

It is desirable for each of the plurality of adjusting screws to be respectively screwed into a plurality of screw holes formed on the reference plate.

It is desirable for each of the plurality of adjusting screws to include a disk-shaped screw, wherein one of opposite surfaces of the disk-shaped screw which can be brought into point contact with the image sensor package is formed as a spherical surface.

It is desirable for the plurality of adjusting screws to include three adjusting screws, each of which can be brought into contact with the image sensor package so that the image sensor package can be supported on respective ends of the three adjusting screws with a gap formed between the image sensor package and the reference plate. An adhesive is injected into the gap to bond the image sensor package to the fixing surface of the reference plate.

It is desirable for the reference plate to have at least one adhesive injection hole which is open to a rear surface of the image sensor package, wherein an adhesive is injected into a gap between the rear surface of the image sensor package and the reference plate through the adhesive injection hole to bond the image sensor package to the fixing surface of the reference plate.

The digital camera can further include a low-pass filter positioned on a front surface of the image sensor package, and a dust-resistant sealing member in the shape of a frame which is positioned between the image sensor package and the low-pass filter so as to surround an imaging surface of the image sensor. The low-pass filter, the dust-resistant sealing member and the image sensor package are provided as a single layer to be held by the holding member while being pressed against the reference plate.

It is desirable for the camera body to include support bosses with which the reference plate is in contact to be fixed to the camera body by set screws which are respectively screwed into the support bosses. A plane, in which end surfaces of the support bosses that are in contact with the reference plate lie, is parallel to a mounting surface of a lens mount provided on the camera body.

It is desirable for the reference plate to be made of a metal plate, and wherein the adhesive is of a type having a high degree of thermal conductivity.

The digital camera can include grease which is partially filled in a space between a rear surface of the image sensor package and the reference plate, the grease having a high degree of thermal conductivity.

It is desirable for the holding member to be fixed to the reference plate by set screws.

The camera body can include a frame having a rectangular aperture through which object light, which is passed through a photographing lens mounted to the mounting surface, is incident on the imaging surface of the image sensor, and the support bosses project from the frame so that the reference frame is fixed to end surfaces of the support bosses.

In another embodiment, a digital camera is provided, including a photographing lens; a frame positioned inside a camera body and having a rectangular aperture through which object light, which is passed through the photographing lens of the digital camera, is incident on a focal plane; an image sensor unit including a reference plate fixed to the frame, and an image sensor package mounted to the reference plate, and the image sensor package including an image sensor; and an adjusting device, incorporated in the image sensor unit, for adjusting at least an inclination of the image sensor with respect to a reference surface of the reference plate.

The present disclosure relates to subject matter contained in Japanese Patent Applications No.2003-281567 (filed on Jul. 29, 2003) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
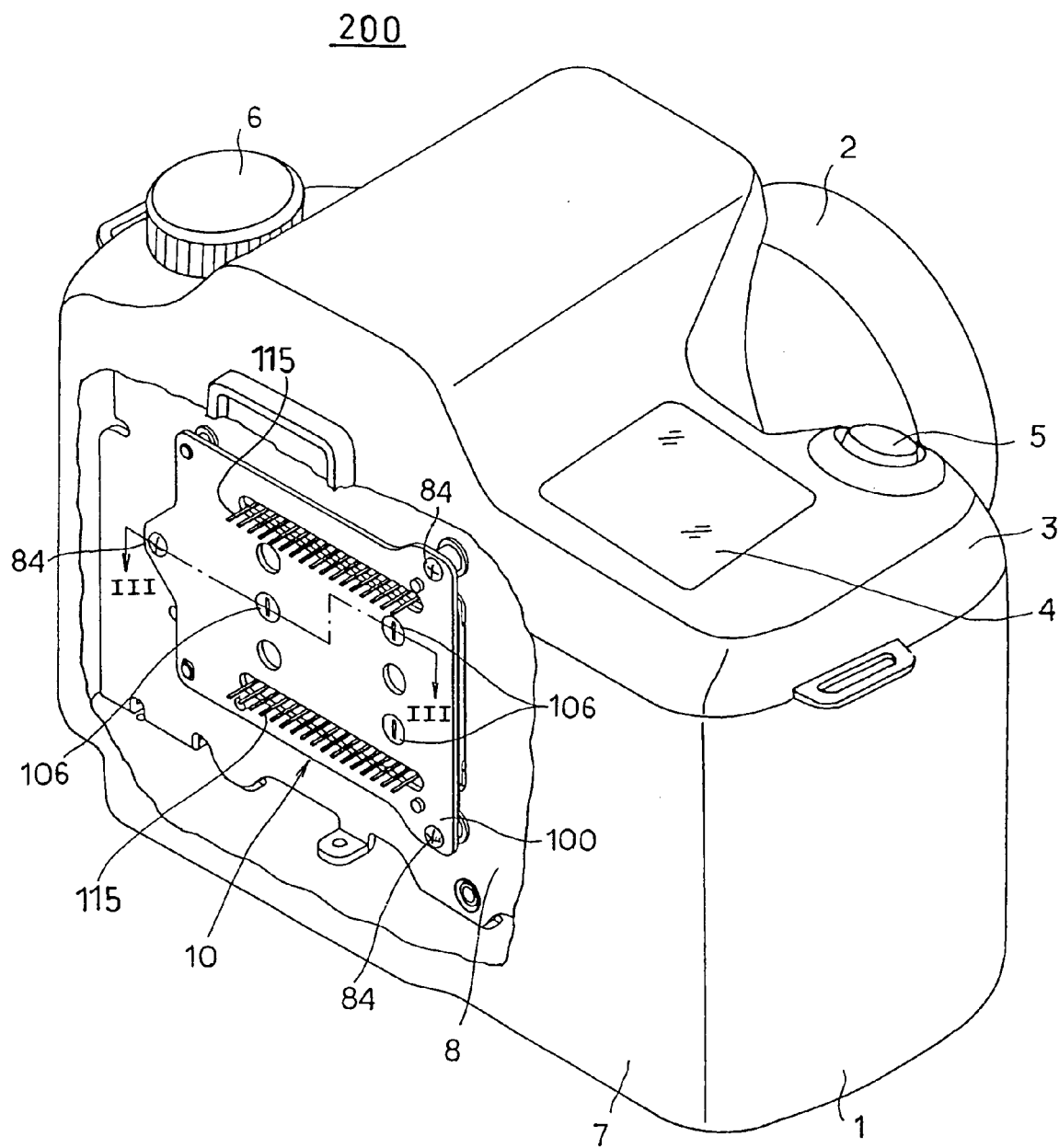
FIG. 1 is a perspective view, with a portion broken away for clarity, of an embodiment of a digital camera according to the present invention, viewed obliquely from behind the digital camera.

FIG. 1 shows an embodiment of a digital camera according to the present invention. The digital camera 200 that is constructed as an SLR digital camera is provided with an interchangeable photographing lens 2 which is detachably attached to the front of a camera body 1. The digital camera 200 is provided on a top cover 3 of the camera body 1 with an LCD indicating portion 4, a release button 5 and a select dial (dial switch) 6. The digital camera 200 is provided on a back cover 7, a portion of which is broken away for clarity in FIG. 1, with an LCD monitor and various switches (all of which are not shown in FIG. 1). The digital camera 200 is provided therein inside the back cover 7 (i.e., inside the camera body 1) with an image sensor unit 10. This image sensor unit 10 will be hereinafter referred to as a CCD unit 10 since the digital camera 200 uses a CCD image sensor as an image pick-up device. The CCD unit 10 is fixed to a main frame 8 positioned inside the camera body 1 in an internal space thereof behind a mirror box (not shown) provided in the camera body 1, so that an imaging surface of a CCD chip 113 (see FIGS. 3 and 5) lies in a focal plane on which an object image is formed through the photographing lens 2.

Figure 2:
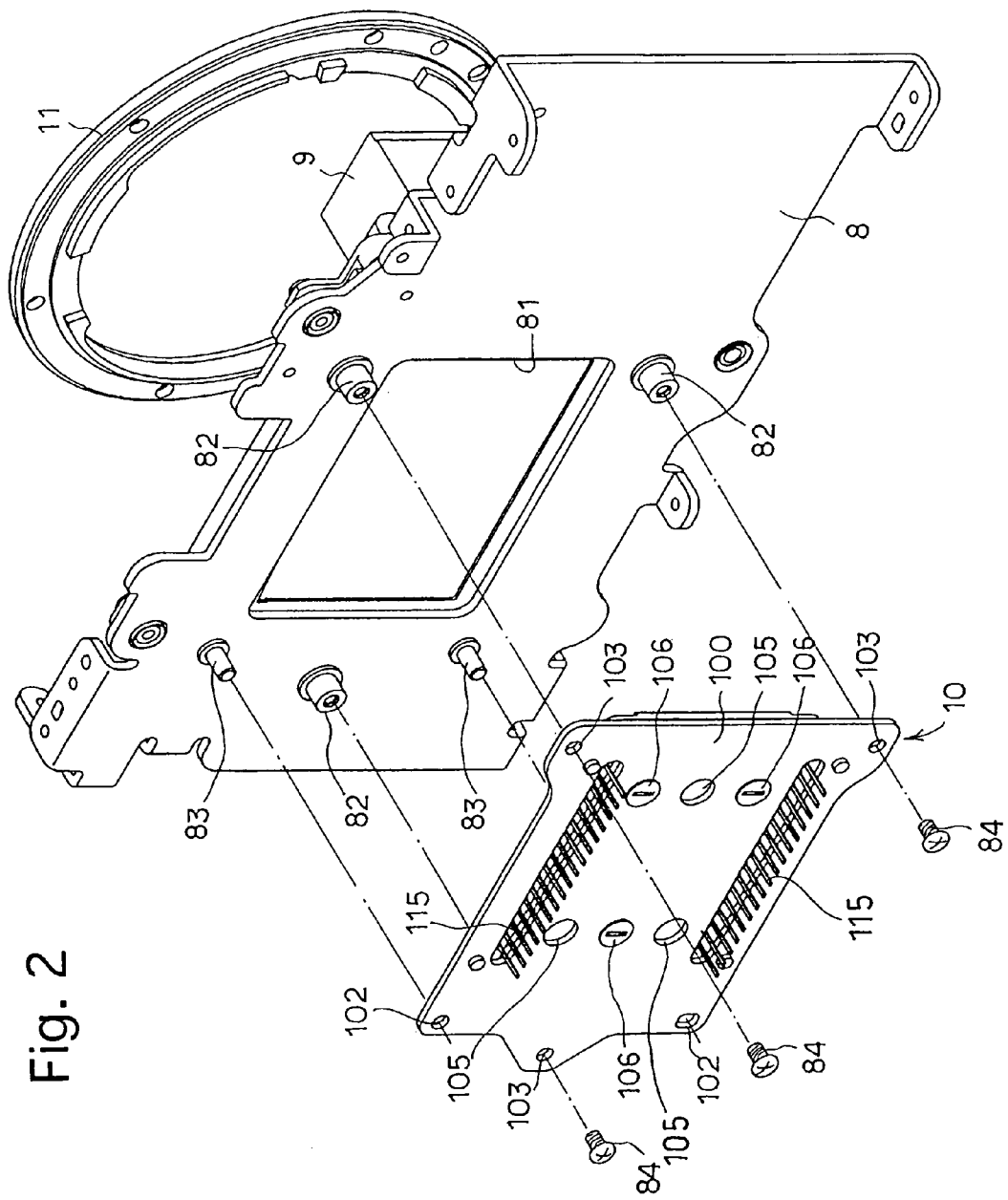
FIG. 2 is an exploded perspective view of elements of the digital camera shown in FIG. 1.
Figure 3:
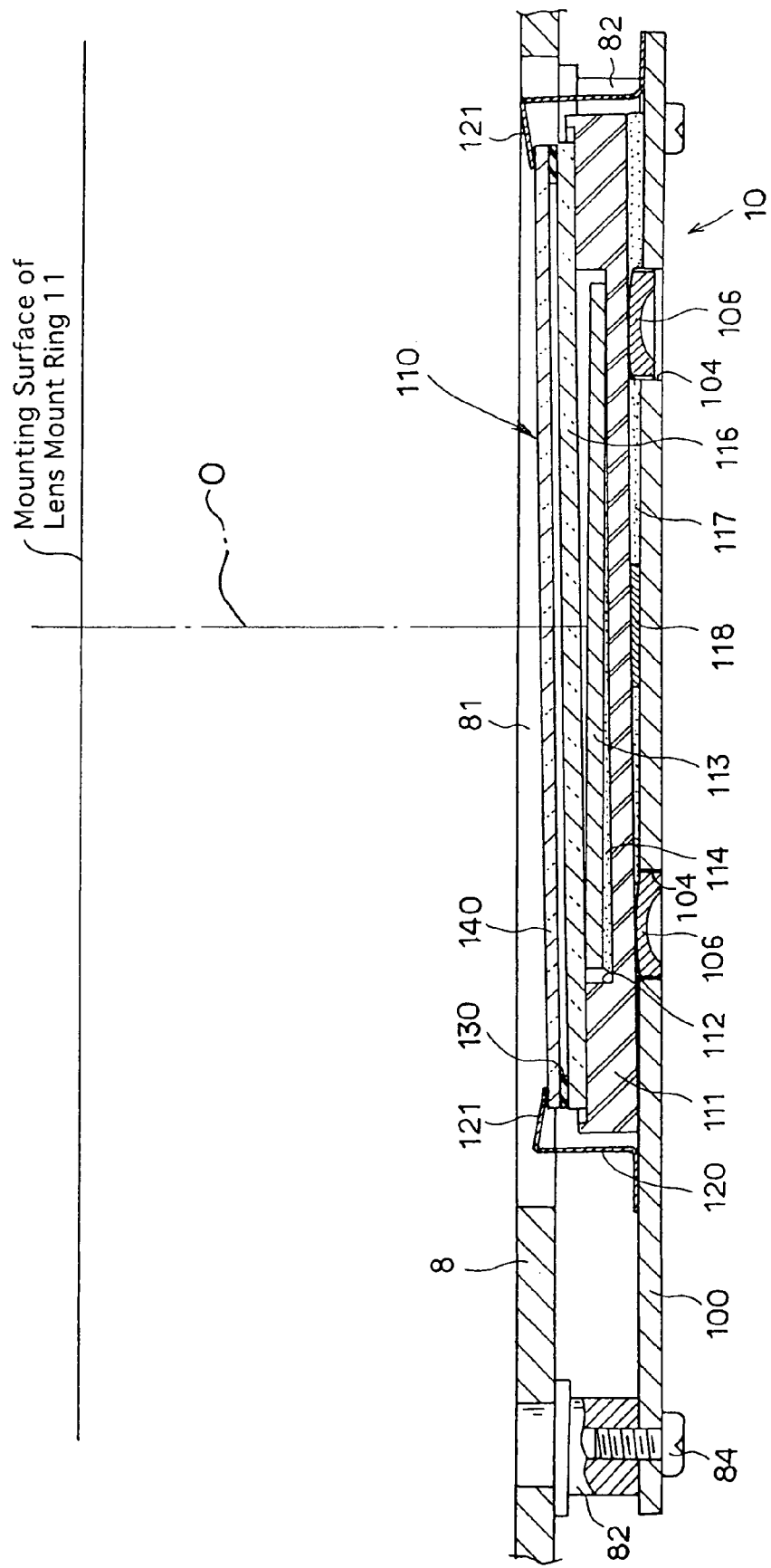
FIG. 3 is an enlarged cross sectional view taken along the III-III line in FIG. 1.

FIG. 2 is an exploded perspective view of elements of the digital camera 200, and FIG. 3 is an enlarged cross sectional view taken along III-III line in FIG. 1. As shown in FIG. 2, the digital camera 200 is provided in front of the main frame 8 with a shutter unit 9, and is provided, in front of the mirror box (not shown) that accommodates the shutter unit 9, with a lens mount ring (lens mount) 11 to which the photographing lens 2 is detachably attached. The lens mount ring 11 is fixed to a front surface of the camera body 1 to be supported thereby. The main frame 8 is made out of a solid metal plate, and is provided with a rectangular aperture 81 through which the CCD unit 10 is communicatively connected with the mirror box so that a light bundle of an object image which is formed through the photographing optical system 2 passes through the rectangular aperture 81 to be focused on the imaging surface of the CCD unit 10. The CCD unit 10 is fixed to the main frame 8 at a position facing the rectangular aperture 81.

The main frame 8 is provided on a rear surface thereof around the rectangular aperture 81 with three cylindrical support bosses 82, each of which is integrally fixed to the main frame 8 by swaging. Three set screws 84 for fixing the CCD unit 10 to the main frame 8 can be screwed into the three cylindrical support bosses 82, respectively. End surfaces of the three cylindrical support bosses 82 are formed to lie in a plane parallel to a mounting surface (front surface) of the lens mount ring 11. Two narrow cylindrical positioning pins 83 project rearward from a rear surface of the main frame 8 at upper and lower positions thereon in the vicinity of upper and lower ends of a side edge (left side edge as viewed in FIG. 2) of the rectangular aperture 81, respectively. Each positioning pin 83 is integrally fixed to the main frame by swaging. Although being discussed in detail later, the positioning pins 83 are respectively engaged in two positioning holes 102 of the CCD unit 10 to position the CCD unit 10 precisely with respect to the main frame 8.

Figure 4:
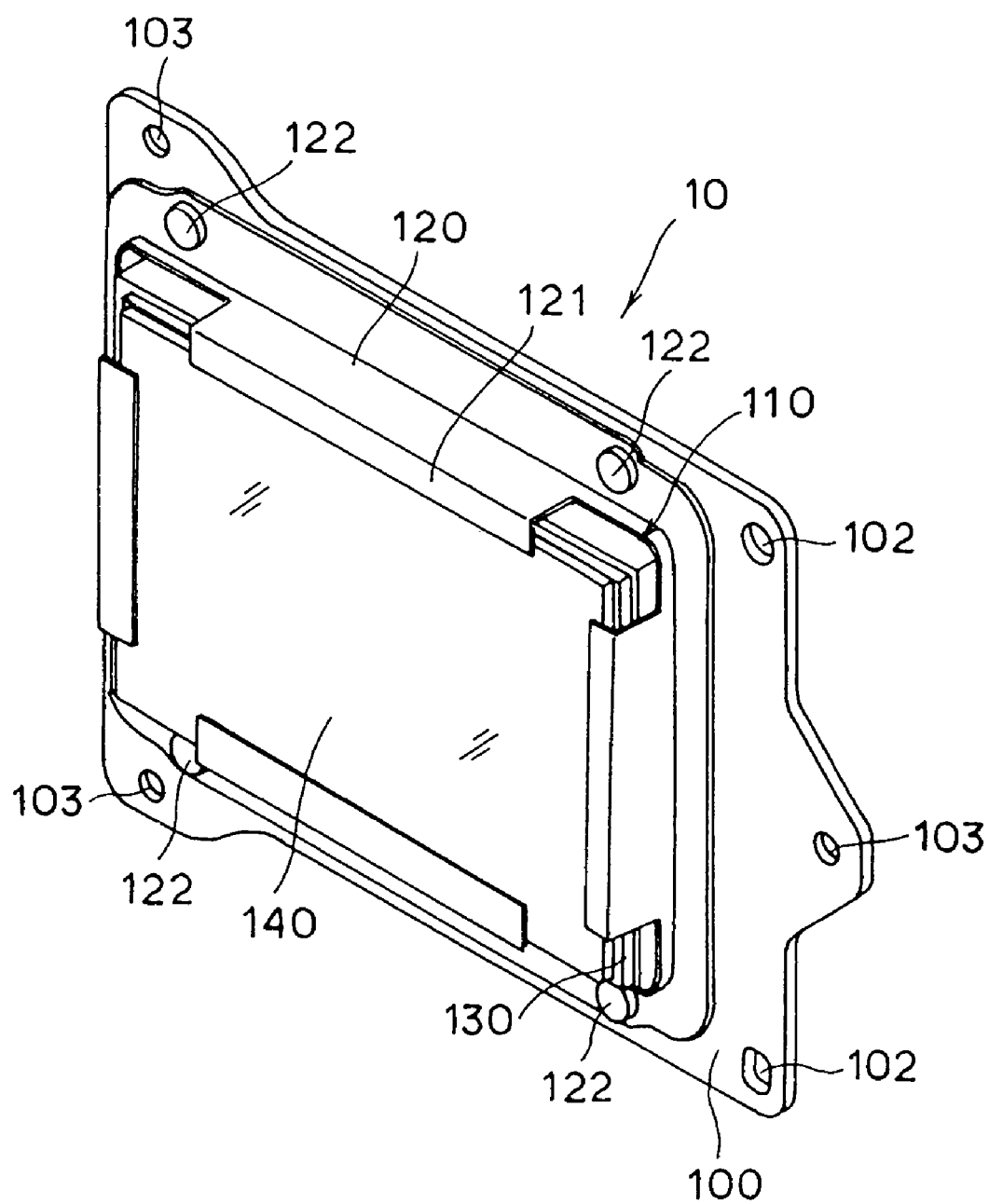
FIG. 4 is a perspective view of a CCD unit, viewed obliquely from the front thereof.
Figure 5:
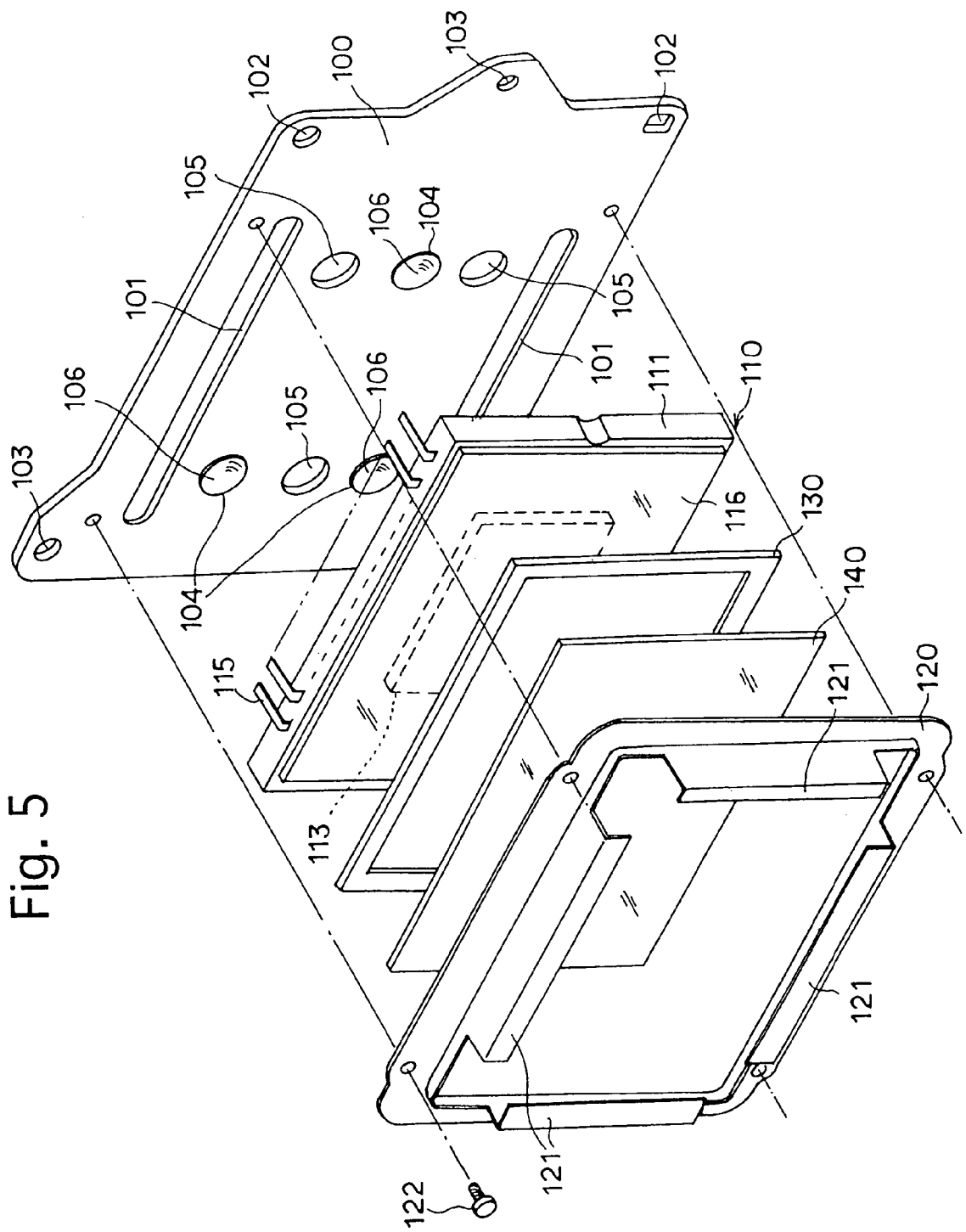
FIG. 5 is an exploded perspective view of the CCD unit shown in FIG. 4.

As shown in the perspective view and the exploded perspective view in FIGS. 4 and 5, respectively, the CCD unit 10 is provided with a reference plate (base plate) 100 and a holding frame (holding member) 120 provided as a separate member from the reference plate 100, and is further provided with a CCD package (image sensor package) 110 which is mounted to the reference plate 100 via the holding frame 120. The CCD package 110 is supplied as a package produced in a factory. As can be seen in FIG. 3, the CCD package 110 is provided with a package base 111 made of a material such as ceramics or resin. The package base 111 is provided on a surface thereof with a mounting recess 112 in which the CCD chip 113 is positioned. The CCD chip 113 is mounted and bonded to a bottom surface of the mounting recess 112 by a bonding agent 114 such as an adhesive or a low-melting solder. If the bonding agent 114 is solidified so as to have an uneven thickness, the imaging surface of the CCD chip 113 cannot be positioned to be precisely parallel to a surface (to which the CCD chip 113 is to be bonded) of the package base 111 as noted above. FIG. 3 shows a case where the CCD chip 113 is bonded to the package base 111 with the imaging surface of the CCD chip 113 being slightly inclined to a surface, to which the CCD chip 113 is to be bonded, of the package base 111 due to an uneven thickness of the bonding agent 114. Although not shown in the drawings, electrodes of the CCD chip 113 are electrically connected to two external lead arrays 115 which extend from the package base 111 via an internal wiring system (not shown). The CCD chip 113 is sealed with a protection glass 116 which is bonded to a front surface of the package base 111.

The base plate 100 is made out of a metal plate having an even thickness, and is provided with two slots 101 in which the two external lead arrays 115 of the CCD package 110 are insertable, respectively. A rear surface of the CCD package 110 is bonded to a front surface (mounting surface) of the reference plate 100 by an adhesive 117 with the two external lead arrays 115 being inserted in the two slots 101, respectively. The reference plate 100 is provided, on a surface thereof other than the surface to which the CCD package 110 is bonded, with the two positioning holes 102 which are formed to correspond to the positions of the two positioning pins 83, respectively, that project from the main frame 8. The reference plate 100 is further provided, at three positions thereon corresponding to the positions of the three support bosses 82, with three fixing holes 103, respectively. The reference plate 100 is provided, on an area thereof to which the CCD package 110 is bonded, with three adjusting screw holes 104 which are positioned around an optical axis O (see FIG. 3) of the CCD chip 113 (which is to be coincident with the optical axis of the photographing lens 2) at three points forming a triangle. The reference plate 100 is provided on the same area thereof with three adhesive injection holes 105. In this particular embodiment, two of the three adhesive injection holes 105 are formed on opposite sides of one of the three adjusting screw holes 104 while the remaining one adhesive injection hole 105 is formed between the remaining two adjusting screw holes 104 as shown in FIG. 5. Three disk-shaped (button-shaped) adjusting screws (adjusting device) 106 for adjusting the angle of the CCD package 110 with respect to the reference plate 100 are screwed into the three adjusting screw holes 104 from behind the reference plate 100, respectively. An end surface of each adjusting screw 106 which faces the package base 111 is formed as a spherical surface to be capable of coming into point contact with a rear surface of the package base 111.

The holding frame 120 is fixed to a front surface of the reference plate 100 that is constructed in the above described manner. The holding frame 120 is fixed to the reference plate 100 by four set screws 122 (only one of them is shown in FIG. 5) which extend through the holding frame 120 at four different points on the periphery of the holding frame 120. The holding frame 120 is made of a resilient metal plate which is shaped into a rectangular frame. The holding frame 120 is provided on four sides thereof with four holding leaves 121, each of which is formed by bending a portion of the holding frame 120. In addition, the present embodiment of the CCD package 110 is provided on a front surface of the protection glass 116 with a dust-resistant sealing member 130 having a rectangular frame shape, and is provided on the dust-resistant sealing member 130 with a rectangular low-pass filter (LPF) 140 having dimensions substantially identical to the dimensions of the protection glass 116. The resiliency of the four holding leaves 121 of the holding frame 120 causes the low-pass filter 140 to be pressed against a front surface of the protection glass 116 via the dust-resistant sealing member 130, and simultaneously presses the low-pass filter 140 and the dust-resistant sealing member 130 against the reference plate 100 to hold the low-pass filter 140, the dust-resistant sealing member 130 and the CCD package 110 to the reference plate 100.

When the CCD unit 10 that has the above described structure is assembled, the two external lead arrays 115 of the CCD package 110 are inserted into the two slots 101 of the reference plate 100 to place the CCD package 110 on the reference plate 100 with the front surface of the reference plate 100 facing upward, and subsequently the dust-resistant sealing member 130 and the low-pass filter 140 are put on the protection glass 116 in that other. Thereafter, the holding frame 120 is put on the reference plate 100 from above the low-pass filter 140 so that the four holding leaves 121 respectively contact with the four sides (edges) of the low-pass filter 140, and is fixed to the reference plate 100 by four set screws 122. Due to the holding frame 120 being fixed to the reference plate 100, the four holding leaves 121 of the holding frame 120 come in pressing contact with the four sides of the low-pass filter 140 to integrally hold the low-pass filter 140, the dust-resistant sealing member 130 and the CCD package 110 between the holding frame 120 and the reference plate 100. Although the CCD unit 10 is assembled in such a manner, it is not yet ensured at this point that the imaging surface of the CCD chip 113 that is packaged in the CCD package 110 is in a precisely parallel relationship to the front surface of the reference plate 100.

Accordingly, after the holding frame 120 is fixed to the reference plate 100 by the four set screws 122 in the aforementioned manner, an adjusting operation for ensuring that the imaging surface of the CCD chip 113 is in precisely parallel relationship to the front surface of the reference plate 100 is performed as necessary. In this adjusting operation, the reference plate 100 is mounted onto a stage of an optical microscope (not shown) to be placed in a plane orthogonal to the optical axis of the optical microscope. Subsequently, the optical microscope is operated to be focused on the imaging surface of the CCD chip 113 while the stage is moved in an X-direction and Y-direction in a plane orthogonal to the optical axis of the optical microscope. At this time, an in-focus state of the optical microscope is ensured at any X-Y points on the imaging surface of the CCD chip 113 if the imaging surface of the CCD chip 113 is positioned to be precisely parallel to the reference plate 100.

On the other hand, in the case where the optical microscope is in out-of-focus at one or more points on the imaging surface of the CCD chip 113, the adjusting screws 106 are operated from behind the reference plate 100 to adjust the angle of the imaging surface of the CCD chip 113 with respect to the reference plate 100. The tip surface of each adjusting screw 106 projects from and retracts into the front surface of the reference plate 100 when the adjusting screw is turned in forward and reverse directions, respectively. When projecting from the front surface of the reference plate 100, the tip surface of one adjusting screw 106 comes into point contact with a rear surface of the package base 111 to push the CCD package 110 forward at this point of contact in a direction away from the front of the reference plate 100. Since the front of the CCD package 110 is pressed resiliently toward the reference plate 100 by the four holding leaves 121 of the holding frame 120 as mentioned above, the CCD package 110 remains held by the holding frame 120 even if pressed forward by the adjusting screw 106. Pressing a portion of the CCD package 110 forward, in a direction away from the front of the reference plate 100, in such a manner changes the angle of the CCD package 110 relative to the reference plate 100. Accordingly, the angle of the CCD package 110 relative to the reference plate 100 can be adjusted by adjusting the three adjusting screws 106 while the imaging surface of the CCD chip 113 is being monitored with an optical microscope. In other words, the inclination of the imaging surface of the CCD chip 113 can be adjusted by adjusting the three adjusting screws 106 while the imaging surface of the CCD chip 113 is being monitored with an optical microscope. Therefore, the inclination of the imaging surface of the CCD chip 113 with respect to the reference plate 100 can be adjusted so that an in-focus state of the optical microscope is ensured at any X-Y points on the imaging surface of the CCD chip 113. At this time, the distance between the reference plate 100 and the imaging surface of the CCD chip 113 is set at a predetermined distance.

After the completion of such an adjusting operation, an adhesive is injected into each of the three adhesive injection holes 105, which are open on the rear surface of the reference plate 100, to be filled in a gap between a front surface of the reference plate 100 and a rear surface of the CCD package 110 (i.e., a rear surface of the package base 111). After being injected into this gap, the adhesive 117 is solidified so as to become solid, to thereby fix the CCD package 110 to the reference plate 100. This ensures that the imaging surface of the CCD chip 113 is in a precisely parallel relationship to the front surface of the reference plate 100, and completes the assembling operation for assembling the CCD unit 10 in which the imaging surface of the CCD chip 113 has been adjusted to be precisely parallel to the reference plate 100 and fixed with respect to the reference plate 100 by the adhesive 117.

Thereafter, the assembly of the CCD unit 10 is fixed to the main frame 8 positioned inside the camera body 1. The position of the CCD unit 10 on a rear flat surface of the main frame 8 is determined by fitting each of the two positioning holes 102 on the associated positioning pin 83 of the main frame 8. Subsequently, the reference plate 100 is fixed to the main frame 8 by screwing the three set screws 84 into the three cylindrical support bosses 82, respectively, with the end surface of each support boss 82 being in contact with the front surface of the reference plate 100 to thereby fix the CCD unit 10 to the main frame 8. Since the plane in which the end surfaces of the three support bosses 82 lie is parallel to the mounting surface of the lens mount ring 11 as noted above, and since the end surface of each support boss 82 is formed at a position away from the mounting surface of the lens mount ring 11 by a predetermined distance in the direction of the optical axis O, the reference plate 100 which has been fixed to the main frame 8 becomes parallel to the mounting surface of the lens mount ring 11 while also the imaging surface of the CCD chip 113 becomes parallel to the mounting surface of the lens mount ring 11 to lie in a focal plane.

As can be understood from the above descriptions, the imaging surface of the CCD chip 113 is set to be parallel to the reference plate 100, and accordingly the CCD unit 10 positioned at a predetermined position with respect to the mounting surface of the lens mount ring 11 is achieved since the CCD package 110 is adjusted so that the imaging surface of the CCD chip 113 becomes parallel to the reference plane 100 by adjusting the adjusting screws 106 and is positioned at a predetermined distance from the reference plane 100 when the CCD package 110 is mounted to the reference plane 100, and so that the CCD package 110 is fixed to the reference plane 100 by the adhesive 117 after the adjustment of the adjusting screws 106. Accordingly, the CCD unit 10 only needs to be provided with the three adjusting screws 106 to achieve a positioning device for positioning the imaging surface of the CCD chip 113. Moreover, the three set screws 84 only have to be screwed into the three support bosses 82, respectively, when the CCD unit 10 is fixed to the main frame 8 since the imaging surface of the CCD chip 113 is adjusted to the reference plate 100 of the CCD unit 10 in advance in the above described manner, which considerably facilitates the fixing of the CCD unit 10 to the main frame 8 which is positioned inside the camera body 1.

Additionally, in the above illustrated embodiment of the digital camera 200, dust can be reliably prevented from being deposited on the front surface of the protection glass 116 of the CCD package 110, especially on an area immediately in front of the imaging surface of the CCD chip 113 since the low-pass filter 140 is incorporated into the CCD unit 10 and because the dust-resistant sealing member 130 is held between the low-pass filter 140 and the CCD package 110. If no low-pass filter such as the low-pass filter 140 is incorporated into the CCD unit 10, a low-pass filter such as the low-pass filter 140 and a dust-resistant sealing member such as the dust-resistant sealing member 130 would have to be fixed to the CCD unit 10 at the same time when the CCD unit 10 is fixed to the main frame 8. However, in such a case there is a possibility of dust being deposited on the front surface of the projection glass 116 of the CCD package 110 when the CCD unit 10 is fixed to the main frame 8, so that it will be necessary for the CCD unit 10 to be fixed to the main frame 8 in a clean room, which complicates the operation fixing to the CCD package to the camera body. Furthermore, in an arrangement in which a dust-resistant sealing member is installed between the main frame 8 and the reference plate 100, there is a possibility of dust intruding into the space immediately in front of the reference plate 100 through the two slots 101 thereof, into which the two external lead arrays 115 are inserted, and being deposited on the front surface of the projection glass 116.

Although the above illustrated embodiment is constructed so that the angle of the imaging surface of the CCD chip 113 with respect to the reference plate 100 can be adjusted to make the imaging surface of the CCD chip 113 precisely parallel to the reference plate 100, and so that the distance from the imaging surface of the CCD chip 113 to the reference plate 100 can be adjusted to a predetermined distance, one of the three adjusting screws 106 can be replaced by a projection which is formed integral with a front surface of the reference plate 100 if the angle of the imaging surface of the CCD chip 113 with respect to the reference plate 100 only needs to be adjusted. In this case, only two adjusting screws 106 are required to be provided, which makes it possible to further simplify the structure of the digital camera 200. Although the three adjusting screw holes 104 are formed on the reference plate 100 in the above illustrated embodiment of the digital camera, the number of the adjusting screw holes 104 can be less than three if the adhesive 117 can be injected into the gap between a rear surface of the CCD package 110 and the reference plate 100 with no air bubbles being produced in the adhesive 117.

It is desirable that an instantaneous adhesive that solidifies in an extremely short period of time be used as the adhesive 117, which is used to bond the CCD package 110 to the reference plate 100. In addition, if an adhesive having a high degree of thermal conductivity is used as the adhesive 117, the heat produced by the CCD chip 113 can be transferred to the reference plate 100 efficiently via the adhesive 117 and can be dissipated from the adhesive 117, which improves the cooling efficiency of the CCD chip 113, thus effectively reducing thermal noise of the CCD chip 113. In the case where it is difficult to adopt an adhesive having a high degree of thermal conductivity, a heat dissipation grease 118 having a high degree of thermal conductivity can be applied to a portion of the rear surface of the package base 111 of the CCD package 110 as shown in FIG. 3 (i.e., on an area of the package base 111 immediately behind the CCD chip 113) so that the heat dissipation grease 118 contacts with a front surface of the reference plate 100 when the CCD package 110 is mounted to the reference plate 100. In this case, the adhesive 117 is injected into the space in which none of the heat dissipation grease 118 exists to bond the CCD package 110 to the reference plate 100, and accordingly, the heat produced by the CCD chip 113 can be dissipated from the reference plate 100 via the heat dissipation grease 118.

The image pick-up device incorporated in a digital camera according to the present invention is not limited solely to a large-format CCD image sensor, and can be any other type of image pick-up device such as a CMOS image sensor. The present invention can be applied to any other digital camera in a similar fashion in the case where an image sensor unit provided in the digital camera incorporates a solid-state image sensor package having a structure wherein the imaging surface of a solid-state image pick-up device other than a CCD image sensor needs to be surely and precisely positioned to be parallel to a base plate of the solid-state image sensor package.

According to the present invention, the image sensor package can be adjusted to become parallel to the imaging surface of the image sensor by adjusting the inclination of the image sensor package with respect to the reference plate by an operation of the adjusting device (adjusting screws) and at the same time the distance between the imaging surface of the image sensor and the reference plate can be adjusted to a predetermined distance by an operation of the adjusting device (adjusting screws) since the image sensor block, in which the image sensor package that contains the image sensor is mounted to the reference plate, incorporates an adjusting device for adjusting at least the inclination of the image sensor with respect to a reference surface of the reference plate. Accordingly, if only the reference plate is installed into a camera body, the image sensor can be fixed to the camera body to be supported thereby so that the imaging surface of the image sensor is positioned orthogonal to the optical axis of a photographing optical system of the digital camera. Consequently, the operation for installing the image sensor block into the camera body can be improved, while the structure for fixing the image sensor block to the camera body can be simplified.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A digital camera, comprising:
    an image sensor unit connected to a camera body, said image sensor unit comprising an image sensor package having an image sensor, and a reference plate which provides a positional reference when connected to said camera body, said image sensor package being mounted to said reference plate; and
    an adjusting device of said image sensor unit configured to adjust at least an inclination of said image sensor with respect to a reference surface of said reference plate, said adjusting device is configured to be adjustable to include said reference surface of said reference plate being oriented parallel to a bottom surface of said image sensor package and said reference surface being brought into surface-to-surface contact with said bottom surface of said image sensor package, said adjusting device comprising:

a holder comprising a resilient material which holds said image sensor package on said reference plate while allowing said image sensor package to be tilted relative to said reference plate, and an end of said holder, which engages said image sensor package, comprises an inclined flange; and a plurality of adjusting screws, each of which is configured to be brought into point contact with said image sensor package so that said image sensor package is supported by a fixing surface of said reference plate via said adjusting screws, wherein a distance between said image sensor package and said fixing surface of said reference plate can be adjusted by turning at least one of said plurality of adjusting screws, wherein the inclined flange is deformable as a result of the turning of said at least one of said plurality of adjusting screws.

2. The digital camera according to claim 1, wherein said image sensor package is bonded to said reference plate after said inclination of said image sensor is adjusted by an operation of said adjusting device.

3. The digital camera according to claim 1, wherein each of said plurality of adjusting screws are screwed into corresponding screw holes provided on said reference plate.

4. The digital camera according to claim 3, wherein each of said plurality of adjusting screws comprises a disk-shaped screw, wherein one of opposite surfaces of said disk-shaped screw, which is configured to be brought into point contact with said image sensor package, comprises a spherical surface.

5. The digital camera according to claim 3, wherein said plurality of adjusting screws comprises three adjusting screws, each of which is configured to be brought into contact with said image sensor package so that said image sensor package can be supported at respective ends of said three adjusting screws, thereby providing a gap between said image sensor package and said reference plate, wherein an adhesive is injected into said gap to bond said image sensor package to said fixing surface of said reference plate.

6. The digital camera according to claim 1, wherein said reference plate has at least one adhesive injection hole which opens to a rear surface of said image sensor package, wherein an adhesive is injected into a gap between said rear surface of said image sensor package and said reference plate through said adhesive injection hole to bond said image sensor package to said fixing surface of said reference plate.

7. The digital camera according to claim 1, further comprising:

a low-pass filter positioned on a front surface of said image sensor package; and a dust-resistant seal comprising a frame positioned between said image sensor package and said low-pass filter so as to surround an imaging surface of said image sensor, wherein said low-pass filter, said dust-resistant seal and said image sensor package are provided as a single layer configured to be held by said holder while being pressed against said reference plate.

8. The digital camera according to claim 1, wherein said camera body comprises support bosses which contact said reference plate, said reference plate being connected to said support bosses via set screws which are respectively screwed into said support bosses, and wherein a plane, in which end surfaces of said support bosses that are in contact with said reference plate lie, is parallel to a mounting surface of a lens mount provided on said camera body.

9. The digital camera according to claim 8, wherein said camera body comprises a frame having a rectangular aperture through which object light, which is passed through a photographing lens mounted to said mounting surface, is incident on said imaging surface of said image sensor, and wherein said support bosses project from said frame so that said reference plate is fixed to end surfaces of said support bosses.

10. The digital camera according to claim 1, wherein said reference plate comprises a metal plate, and wherein said adhesive is of a type having a high degree of thermal conductivity.

11. The digital camera according to claim 1, further comprising grease which is partially filled within a space provided between a rear surface of said image sensor package and said reference plate, said grease having a high degree of thermal conductivity.

12. The digital camera according to claim 1, wherein said holder is connected to said reference plate by set screws.

13. The digital camera according to claim 1, wherein the inclined flange comprises a plurality of holding leaves.

14. A digital camera comprising:

a photographing lens;

a frame positioned inside a camera body and having a rectangular aperture through which object light, which is passed through said photographing lens of said digital camera, is incident on a focal plane;

an image sensor unit comprising a reference plate connected to said frame, and an image sensor package mounted to said reference plate, and said image sensor package having an image sensor; and an adjusting device of said image sensor unit configured to adjust at least an inclination of said image sensor with respect to a reference surface of said reference plate, said adjusting device is configured to be adjustable to include said reference surface of said reference plate being oriented parallel to a bottom surface of said image sensor package and said reference surface being brought into surface-to-surface contact with said bottom surface of said image sensor package, said adjusting device comprising:

a holder comprising a resilient material which holds said image sensor package on said reference plate while allowing said image sensor package to be tilted relative to said reference plate, and an end of said holder, which engages said image sensor package, comprises an inclined flange; and a plurality of adjusting screws, each of which is configured to be brought into point contact with said image sensor package so that said image sensor package is supported by a fixing surface of said reference plate via said adjusting screws, wherein a distance between said image sensor package and said fixing surface of said reference plate can be adjusted by turning at least one of said plurality of adjusting screws, wherein the inclined flange is deformable as a result of the turning of said at least one of said plurality of adjusting screws.

15. The digital camera according to claim 14, wherein the inclined flange comprises a plurality of holding leaves.

* * * * *